United States Patent
Perez Ramos et al.

(10) Patent No.: US 10,218,722 B2
(45) Date of Patent: Feb. 26, 2019

(54) METHOD AND SYSTEM FOR DEVELOPING AN ANOMALY DETECTOR FOR DETECTING AN ANOMALY PARAMETER ON NETWORK TERMINALS IN A DISTRIBUTED NETWORK

(71) Applicants: Yandy Perez Ramos, Jacksonville, FL (US); Aldo Ferrante, Ponte Vedra, FL (US)

(72) Inventors: Yandy Perez Ramos, Jacksonville, FL (US); Aldo Ferrante, Ponte Vedra, FL (US)

(*) Notice: Subject to any disclaimer, the term of this patent is extended or adjusted under 35 U.S.C. 154(b) by 4 days.

(21) Appl. No.: 14/947,272

(22) Filed: Nov. 20, 2015

(65) Prior Publication Data

US 2016/0088008 A1    Mar. 24, 2016

Related U.S. Application Data

(60) Provisional application No. 62/053,787, filed on Sep. 22, 2014.

(51) Int. Cl.
*H04L 9/00* (2006.01)
*H04L 29/06* (2006.01)

(52) U.S. Cl.
CPC ...... *H04L 63/1425* (2013.01); *H04L 63/1416* (2013.01)

(58) Field of Classification Search
CPC .................................................. H04L 63/1425
See application file for complete search history.

(56) References Cited

U.S. PATENT DOCUMENTS

2011/0055920 A1* 3/2011 Hariri ................... G06F 21/552
                                                               726/22
2016/0373477 A1* 12/2016 Moyle ................... G06F 21/552

* cited by examiner

*Primary Examiner* — Alexander Lagor
*Assistant Examiner* — Syed M Ahsan
(74) *Attorney, Agent, or Firm* — Wilson Dutra, PLLC; Camille A. Wilson

(57) ABSTRACT

The present invention discloses a computer implemented method for developing an anomaly detector which is adapted to detect/predict anomaly in one or more network terminals and optimize the behavior of the network terminals. The said method is adapted to collect and monitor the behavior of the network terminals and compare it with the behavior profile of the network terminals in order to detect the anomaly parameter. The behavior profile is the normal interaction of the software and hardware components of the network terminals. A system for implementation and execution of such anomaly detector is also disclosed.

10 Claims, 14 Drawing Sheets

METHOD AND SYSTEM FOR DEVELOPING AN ANOMALY DETECTOR FOR DETECTING AN ANOMALY PARAMETER ON NETWORK TERMINALS IN A DISTRIBUTED NETWORK

FIELD OF THE DISCLOSURE

The field of the present invention relates generally to systems and methods for detecting and predicting anomaly parameter in network terminals in a distributed network. More specifically, the systems and methods relate to an anomaly detector which is capable of collecting data and detecting/predicting anomalies in network terminals based upon various collected data in a distributed network.

BACKGROUND OF THE DISCLOSURE

In recent times, there has been tremendous development in the field of distributed networking and in areas of open platform communication (OPC) systems.

OPC was initially designed to provide common bridge between Windows-based software applications and process control systems. This has enabled a smooth flow in exchanging of information and smooth working coordination between the process control systems and the Windows-based software applications. Although such coordination provides a good working and functioning of the control systems, there are problems when anomalies arise in the said systems.

In recent years, number of computer hackers has risen considerably. They have been exploiting vulnerabilities in computer software. Such attacks usually exploit application program vulnerabilities to install and execute a malicious program such as a virus, spyware, trapdoor, backdoor, or the like with the authority of a normal application program process. In such cases, the system deviates from its normal behavior or normal interaction with various components. There are scenarios when the system may run slower than usual. There may be scenarios when the system may show error messages and stop working at all. In order to have a smooth working or functioning of the systems, there is a need for systems and methods for detecting or predicting anomalies in the behavior of systems and optimize the behavior in accordance with the requirements.

However, currently, there does not exist any software and hardware tool that fully integrates the ability to detect-predict anomalies and optimize system behaviors using a Distributed Architecture in a wide area network over the internet, intranet or local area network. There is a need for systems and methods which have the ability to detect/predict anomalies in a system and optimize the functioning of the system. Hence, there is a need for a software and hardware tool that fully integrates the ability to detect anomaly parameters and optimize systems in a Distributed Architecture.

SUMMARY OF THE DISCLOSURE

In view of the foregoing disadvantages inherent in the prior-art and the needs as mentioned above, the general purpose of the present disclosure is to provide a system and method for developing an anomaly detector for detecting/predicting anomaly parameter in network terminals in a distributed network and designed to include all advantages of the prior art and to overcome the drawbacks inherent in the prior art offering some added advantages.

To achieve the above objectives and to fulfill the identified needs, in one aspect, the present invention provides a computer implemented method for developing an anomaly detector for detecting and predicting anomaly parameter in one or more network terminals and optimizing the behavior of the said one or more network terminal in a distributed network. The computer implemented method comprises collecting behavioral data from the one or more network terminals, monitoring the behavior of the one or more network terminals on the basis of collected behavioral data, and detecting anomaly parameter in the one or more network terminals by comparing the collected behavioral data with the behavior profile of the one or more network terminals, wherein the behavior profile of the one or more network terminals is pre-stored in a distributed knowledge database. Further, the method includes optimizing and updating the behavior of the said one or more network terminals, wherein the anomaly detector selects an intelligent agent comprising an algorithm for optimizing and updating the behavior of the one or more network terminals in the distributed network.

In an aspect of the present invention, the anomaly detector comprises a hardware platform module for determining structure of the one or more network terminals.

In an aspect of the present invention, the anomaly detector comprises a retrain module for updating the anomaly detector with new behavioral data from the one or more network terminals.

In an aspect of the present invention, the distributed knowledge database is stored on a server.

In an aspect of the present invention, the behavior profile of the one or more network terminals comprises predefined functioning of the one or more network terminals.

In an aspect of the present invention, the predefined functioning comprises the normal interaction of various hardware and software components of the one or more network terminals.

In yet another aspect, the present invention provides a system for detecting and predicting anomaly parameter in one or more network terminals and optimizing the behavior of the said one or more network terminals in a distributed network. The system includes one or more processors, a memory comprising an anomaly detector and executable by the one or more processors to perform the steps of collecting behavioral data from the one or more network terminals, monitoring the behavior of the one or more network terminals on the basis of collected behavioral data. Further, the system is adapted to detect anomaly parameter in the one or more network terminals by comparing the collected behavioral data with the behavior profile of the one or more network terminals. Further, the behavior profile of the one or more network terminals is pre-stored in a distributed knowledge database and optimizing and updating the behavior of the said one or more network terminals. Further, the anomaly detector is adapted to select an intelligent agent comprising an algorithm for optimizing and updating the behavior of the one or more network terminals in the distributed network.

In yet another aspect, the present invention provides a computer program product comprising executable instructions, which, when executed by one or more processors, cause the one or more processors to carry out the steps of collecting behavioral data from the one or more network terminals, monitoring the behavior of the one or more network terminals on the basis of collected behavioral data, detecting anomaly parameter in the one or more network terminals by comparing the collected behavioral data with the behavior profile of the one or more network terminals, wherein the behavior profile of the one or more network terminals is pre-stored in a distributed knowledge database. Further, the processor executes instructions for optimizing and updating the behavior of the said one or more network terminals, wherein the anomaly detector selects an intelligent agent comprising an algorithm for optimizing and updating the behavior of the one or more network terminals in the distributed network.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

BRIEF DESCRIPTION OF THE DRAWINGS

The advantages and features of the present disclosure will become better understood with reference to the following detailed description and claims taken in conjunction with the accompanying drawing, in which:

Like numerals refer to like elements throughout the present disclosure.

DETAILED DESCRIPTION OF THE DISCLOSURE

Figure 1:
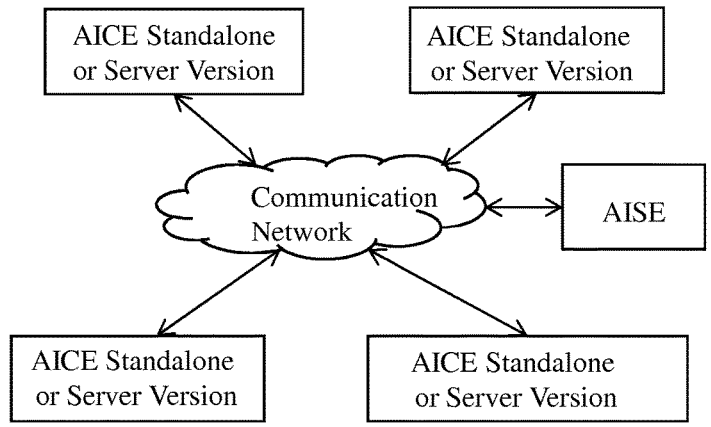
FIG. 1 illustrates a schematic diagram about the various components in a distributed network, according to various embodiments of the present invention.

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

The terms "a" and "an" herein do not denote a limitation of quantity, but rather denote the presence of at least one of the referenced item.

The terms "having", "comprising", "including", and variations thereof signify the presence of a component.

The term "distributed network" refers to a network of various components in client-server architecture such that the various components are able to share the resources over the network.

The term "Programmable Logic Controller or PLC" refers to electronic device used in many industries to monitor and control building systems and production processes.

The term "embedded system" refers to a computer system with a dedicated function within a larger mechanical or electrical system, often with real-time computing constraints. Such embedded systems control many devices in common use today.

The terms "communication network" and "distributed network" are being used interchangeably throughout the disclosure of the present invention.

The present invention relates to a computer implemented method for developing an anomaly detector. The "anomaly detector" can detect or predict anomaly parameter in a network terminal from a given set of behavioral data.

The present invention includes a software-hardware Distributed Architecture to measure anomaly parameters using Artificial Intelligence. The present invention includes the capability to measure anomaly parameters based on related data for creating a Distributed Knowledge database or Learning System. The present invention is capable of being installed on different devices such as Computers, Mobile Devices, Programmable Logic Controller and Embedded Platforms. However, this should not be construed as a limitation to the present invention. Accordingly, the present invention is capable of being used on any computing device.

It will be apparent to a person skilled in the art that distributed computing architecture is computing systems in which components are located on networked computers who coordinate their actions by passing messages which means sending a message to a process and relying on the process and the supporting infrastructure to select and invoke the actual code to run.

For proof-of concept, the present invention provides system and method (hereinafter interchangeably called as "anomaly detector" or "Artificial Intelligent Client Engine (AICE)" or "system") for developing an anomaly detector which is capable of detecting or predicting anomaly parameter from a set of behavioral data.

Referring now to the Figures, the present invention provides an anomaly detector system which includes a software run on one or more network terminals, for example—a Computer, Embedded System, Programmable Logic Controller, Server and Mobile Device. Further, the anomaly detector system includes a Data collection module which is adapted to retrieve the behavioral data set to be used by the anomaly detector. Further, the anomaly detector system is adapted to retrieve the data set from the one or more network terminals.

In one embodiment, the present anomaly detector system includes a Find Best Algorithm Module which is adapted to find the best intelligent agent (Algorithm) to be used in a specific application. The anomaly detector system further includes a Select Hardware Platform Module which determines the structure of the system depending on the platform of one or more network terminals that is selected. Further, the anomaly detector system includes a Manual or Automatic Retrain Module to keep the anomaly detector learning from all the new conditions or behaviors of the one or more network terminals. Further, the anomaly detector includes a User Interface (Visualization of the Data) for showing the data related to one or more network terminals.

In one embodiment, the anomaly detector system includes Data Log Service or a disturbed knowledge database which is adapted to collect and store behavior profile data to be used for the anomaly detector from one or more network terminals. The anomaly detector system is adapted to get the values for the anomaly parameters that are measured from one or more network terminals. The said one or more network terminals could use a PC (Personal Computer), a Smart computing device, an Embedded platform or a PLC (Programmable Logic Controller).

In another embodiment, the anomaly detector system is a software, hardware and combination thereof. Further, the anomaly detector system is able to complete the requisite tasks and provide the user with the useful tool to detect anomaly parameter of a network terminal. Further, the anomaly detector system allows a user to change or adjust any behavior of the tool; it can change the way how the tool collects the data, the way that it retrains the agents, or the platform that it uses. The anomaly detector system can be used in any kind of system or process, as medical field, health care field, industrial field, Commercial field, social field, logistics field, manufacturing field, financial field, and refrigeration field.

The various embodiments of the present invention shall now be explained in conjunction with FIGS. 1-15.

Figure 2:
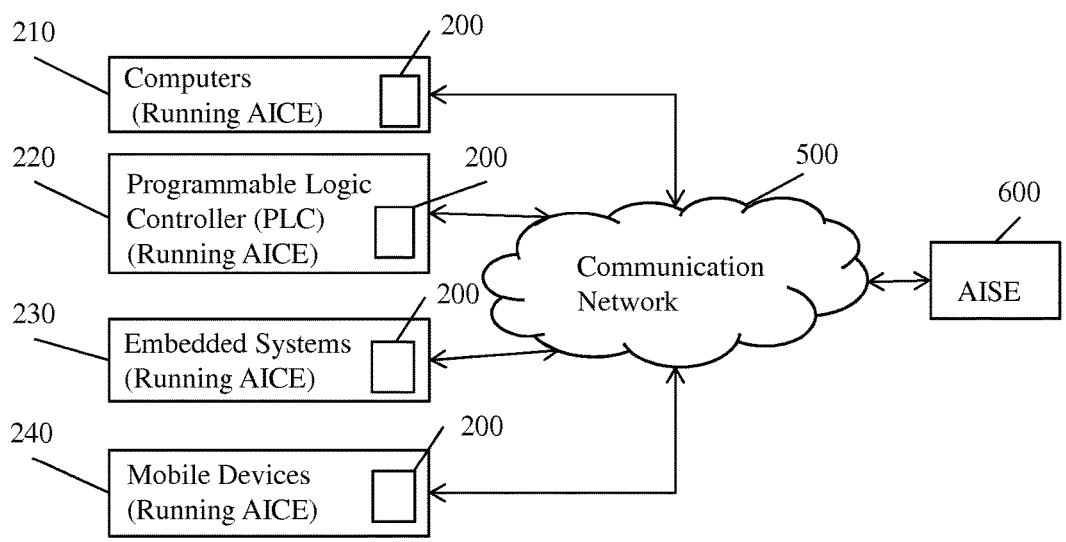
FIG. 2 illustrates a schematic diagram with different platforms running the Artificial Intelligent Server Engine (AISE), according to various embodiments of the present invention.

Referring to FIGS. 1 and 2, there are shown schematic diagram for the functioning of the present invention. FIGS. 1 and 2 illustrate different versions of Artificial Intelligent Client Engine (AICE) running on various platforms such as AICE Standalone version, AICE Mobile version, AICE Embedded system and AICE Web base version. Further, there is shown an Artificial Intelligent Server Engine (AISE) for communicating with all the versions of Artificial Intelligent Client Engine (AICE) through communication network.

Further, FIG. 2 illustrates a computer 210, a programmable logic controller (PLC) 220, an embedded system 230 and a mobile device 240 having an artificial intelligent client engine (AICE) 200. Furthermore, the Artificial Intelligent Client Engine (AICE) 200 is adapted to communicate with the Artificial Intelligent Server Engine (AISE) 600 via communication network 500 for detecting anomaly based on user's requirement. Moreover, the Artificial Intelligent Client Engine (AICE) 200 includes an intelligent agent (not shown) including an algorithm for performing the specific function in the distributed network based on the user's (not shown) requirement.

Figure 3:
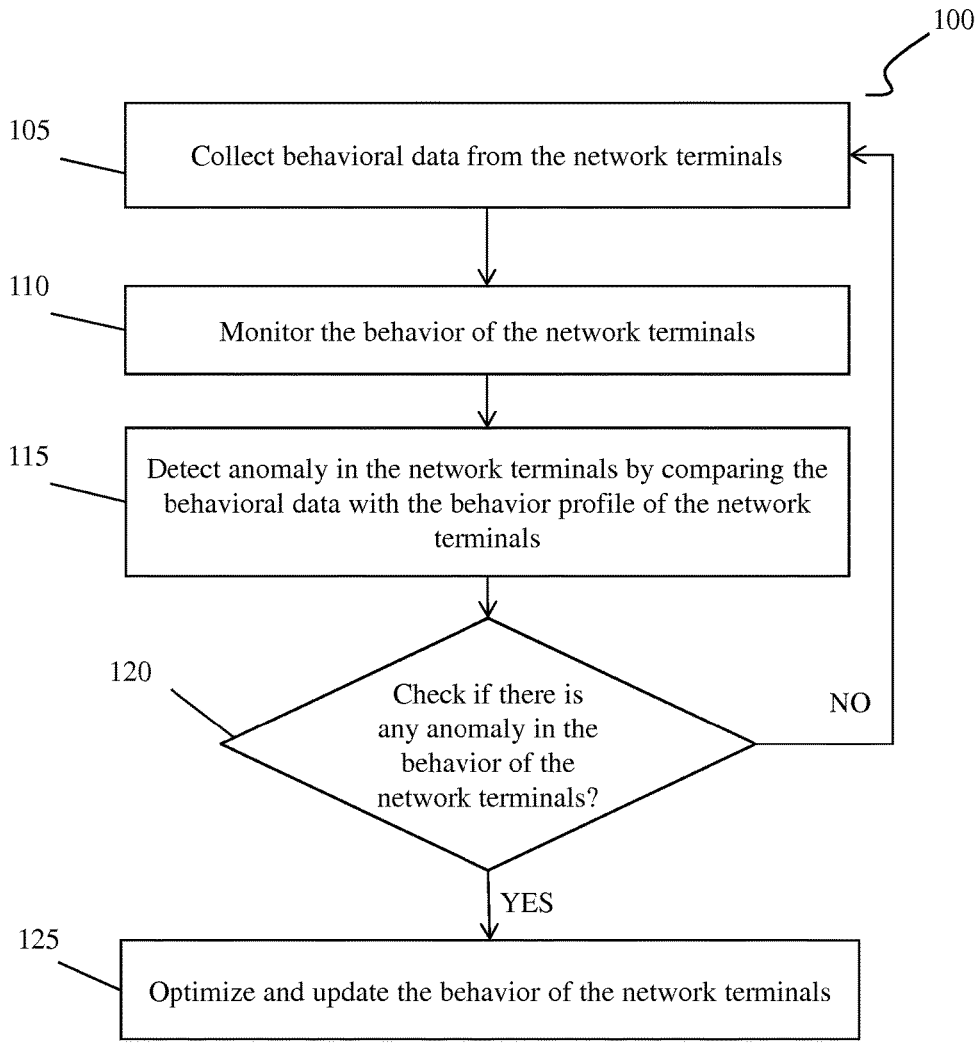
FIG. 3 illustrates a flowchart for the method involved in developing the anomaly detector, according to various embodiments of the present invention.

FIG. 3 illustrates a flowchart showing the various steps involved in the method 100 for developing an anomaly detector for detecting and predicting anomaly parameter in one or more network terminals for optimizing the behavior of the said one or more network terminals in a distributed network. The method 100 is adapted to detect the anomaly parameter of the one or more network terminals by comparing the behavioral data of the network terminals with the behavioral profile of the network terminals. The behavior profile of the various network terminals is pre-stored in a Distributed Knowledge Database. Distributed Architecture relates to the architecture as explained with reference to FIGS. 1 & 2.

The method 100 is capable of being installed on a computing device but not limited to a desktop, laptop, Programmable Logic Control, Embedded device, smart device, such as, a tablet and smart phone. The method 100 is capable of being installed as an application on a smart device such as a smart phone.

In an embodiment, the method 100 is accessible by a computing device using a web browser such as the Internet explorer, Google chrome, and others. In another way, the method 100 can be accessed via the web browser using the internet, extranet, intranet, host server, internet cloud and the like.

In an embodiment, the method 100 is capable of being integrated with the ability to measure parameters using Artificial Intelligence (AI) on a computing device such as Computers, Mobile Devices, Programmable Logic Controller or Embedded Platforms. It will be apparent to a person skilled in the art that Artificial Intelligence relates to the computer science dealing with simulation of intelligent behavior in computers. It means using AI, computers are made to think like human beings. There are various intelligent agents or algorithms which are designed for such functionality.

Referring to FIG. 3, the method 100 starts at step 105. At this step 105, the method 100 or the anomaly detector is adapted to collect behavioral data from one or more network terminals in a distributed network. However, this should not be construed as a limitation for the method 100. There can be other parameters as well for the method 100.

In another embodiment, the network terminals are a Computer, Embedded System, Programmable Logic Controller, Server and Mobile Device.

In an embodiment, the network terminals are a combination of software and hardware components meant to interact with each other for accomplishing certain task.

Once the behavioral data is collected, the method 100 flows to step 110. At step 110, the method is adapted to monitor the behavior of the one or more network terminals on the basis of the collected behavioral data from the previous step.

At step 115, the method 100 is adapted to detect/predict anomaly parameter in the one or more network terminals. The method 100 is adapted to compare the present behavior of the network terminals with the behavior profile of the said network terminals. The behavior profile of the network terminals is pre stored in a Distributed knowledge database. The behavior profile is depends on the predefined functioning of the network terminals. The predefined functioning of the network terminals includes the normal interaction between the software and hardware components of the network terminals. It will be apparent to a person skilled in the art that by normal interaction, it is understood that software and hardware component communicate with each other in the way they are supposed to perform.

Thereafter, the method 100 flows to step 120 where the system is adapted to check whether there is an anomaly. If there is no anomaly detected, the method 100 returns to the first step of collecting the behavioral data about the one or more network terminals.

At step 120, if the method 100 detects an anomaly parameter in the one or more network terminals, then the method 100 flows to step 125 where the method 100 is adapted to optimize and update the behavior of the one or more network terminals.

In an embodiment, the anomaly detector includes an intelligent agent which comprises an algorithm capable of optimizing the behavior of the network terminals. This however should not be construed to be a limitation of the method. Intelligent agents are typically methods which get the parameters from the network terminals and act upon an environment and directs towards achieving certain tasks.

Figure 4:
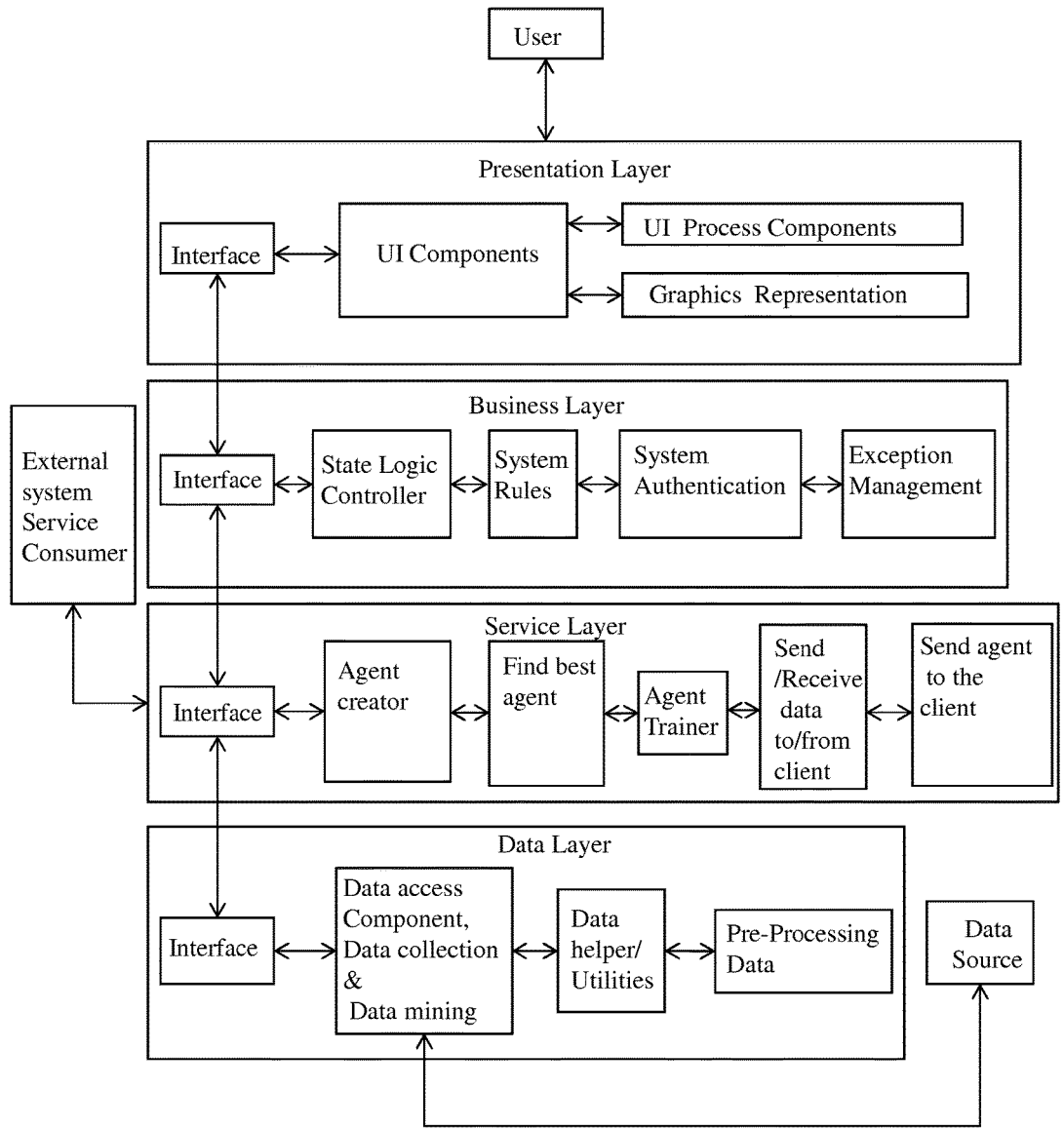
FIG. 4-5 illustrate a schematic diagram of an Artificial Intelligent Server Engine (AISE) module and an Artificial Intelligent Client Engine (AICE), according to various embodiments of the present invention.

Now referring to FIG. 4, there is shown an Artificial Intelligent Server Engine (AISE) accessible by the one or more network terminals via communication network. The Artificial Intelligent Server Engine (AISE) includes a presentation layer, business layer, a service layer and a data layer. Further, Artificial Intelligent Server Engine (AISE) layers are configured with common interface for performing different functions. Further, the presentation layer includes user interface (UI) components, a user interface process components and graphics representation component configured with the common interface.

Further, the common interface allows a user to navigate Artificial Intelligent Server Engine (AISE). Further, the common interface allows a user to provide user input based on the user requirement. Furthermore, the common interface is configured with business layer having a state logic controller, a system rules, a system authentication which is adapted to authenticate the one or more network terminal and exception management for handling the exception occurring during the process.

Also, the common interface is configured with the service layer. The service layer includes an intelligent agent creator module for Artificial Intelligent Client Engine (AICE), a find best module for the one or more network terminals which is adapted to search and select the best intelligent agent based on the one or more network terminals requirement, an agent trainer which is adapted to update the intelligent agent with the new conditions and situation by accessing the distributed knowledge database or one or more network terminal, a send/receive data module which is adapted to send or receive data to/from one or more network terminals/clients, a module to send intelligent agent to the Artificial Intelligent Client Engine (AICE) running on one or more network terminal.

Furthermore, the common interface is configured with the data mining layer. The data mining layer includes a data access, mining and collection module for receiving the data from a data source and send to a data helper for pre-processing the data and stored in the data source.

Figure 5:
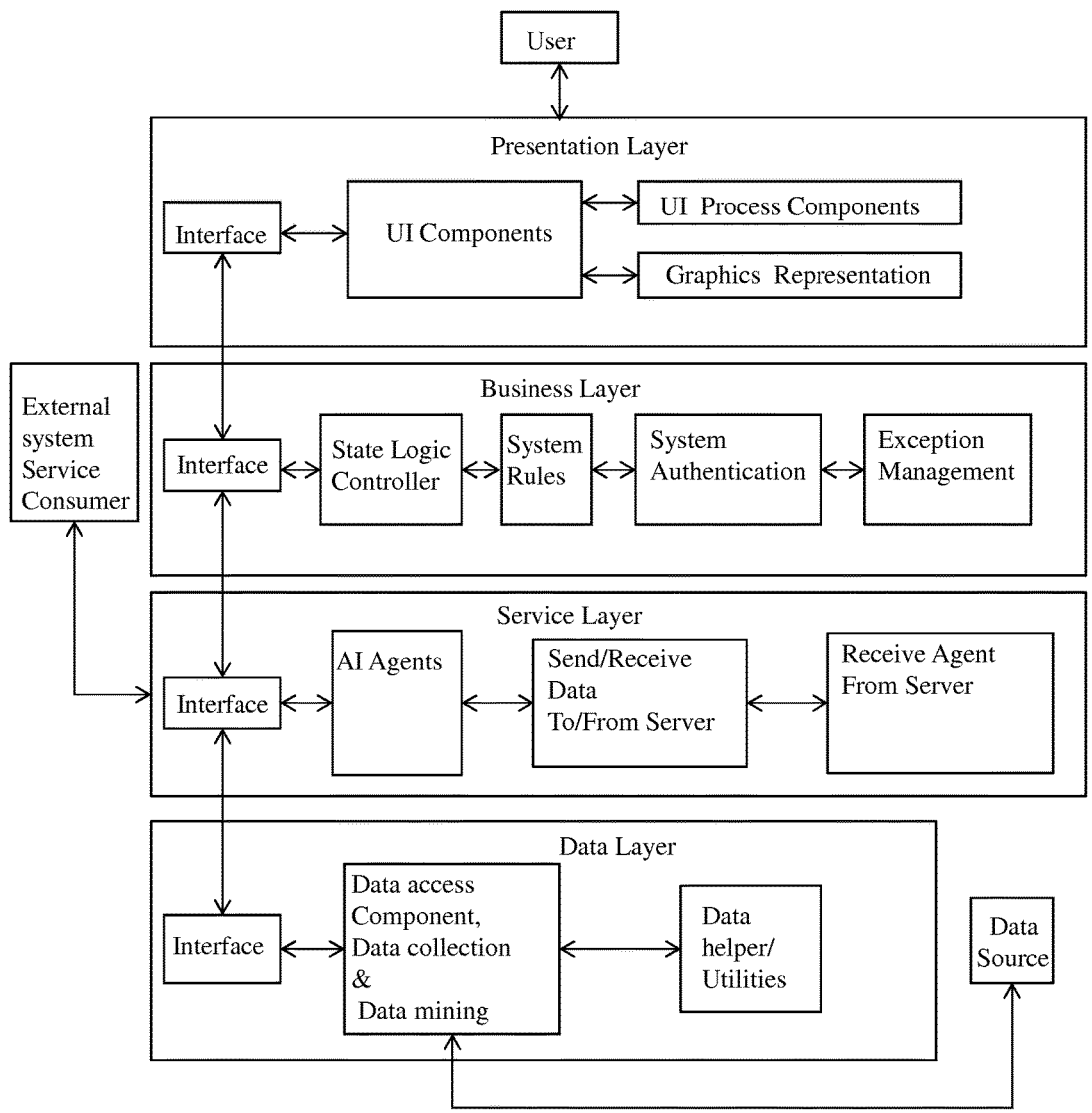

Now referring to FIG. 5, there is shown an Artificial Intelligent Client Engine (AICE) running on the one or more network terminal. The Artificial Intelligent Client Engine (AICE) includes a presentation layer, business layer, a service layer and a data layer. Further, the presentation layer and the business layer are same as described above in FIG. 4. Further, the service layer is adapted to receive an intelligent agent from the Artificial Intelligent Server Engine (AISE) based on the user requirement. Further, the data layer is adapted to collect data and provides data access from the data source or distributed knowledge database. Furthermore, the data layer includes data helper/utilities for arranging the data in a specific format.

Figure 6:
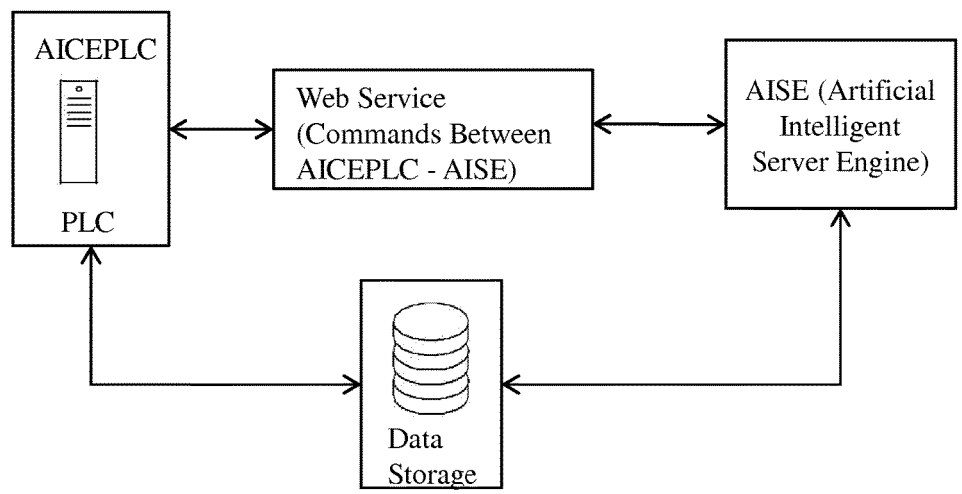
FIG. 6 illustrates a schematic diagram of an example system to provide the Artificial Intelligent Server Engine (AICE) communication with AICEPLC (Artificial Intelligent Client Engine (AICE) for programmable logic controller) and data storage, according to various embodiments of the present invention.
Figure 7:
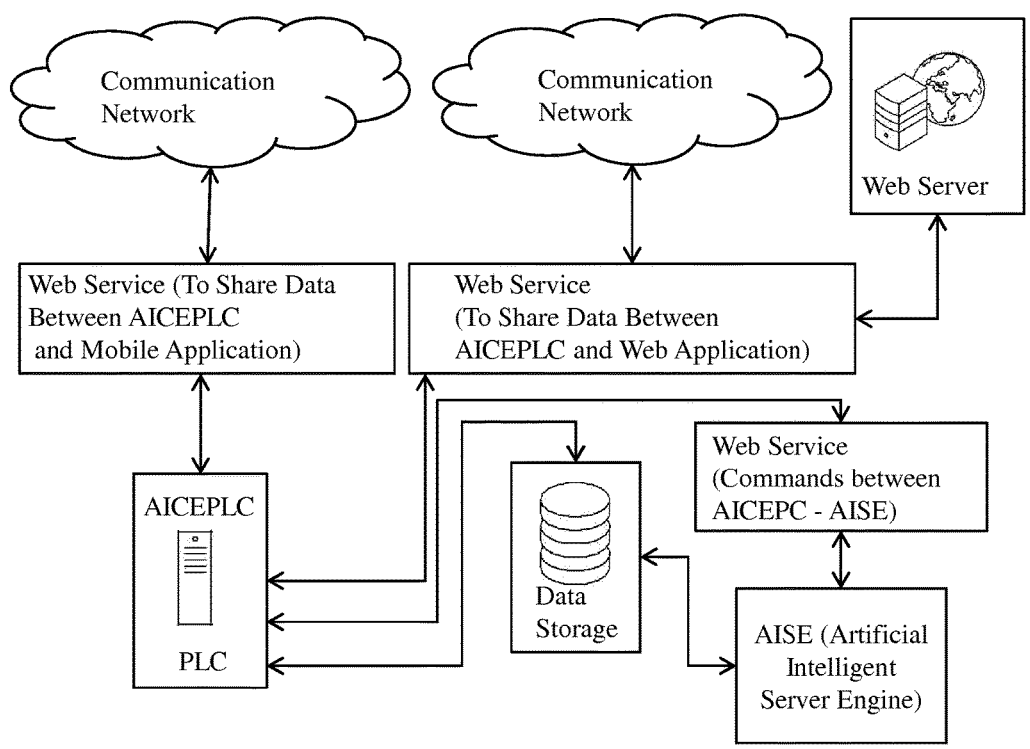
FIG. 7 illustrates a schematic diagram of an example system to provide the Artificial Intelligent Client Engine (AICE) for PLC (programmable logic controller), according to various embodiments of the present invention.
Figure 8:
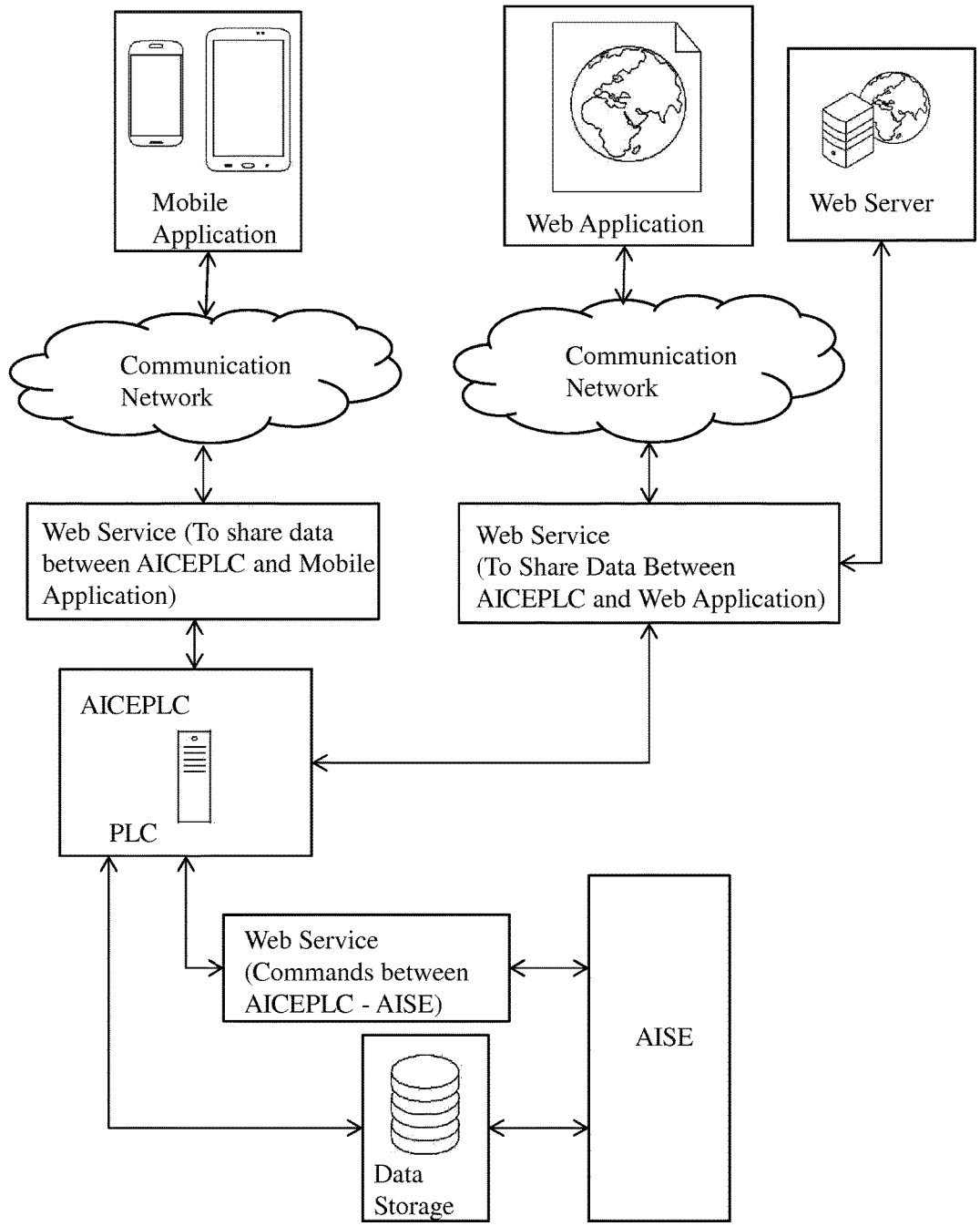
FIG. 8 illustrates a schematic diagram with different platforms running the Artificial Intelligent Client Engine (AICE), according to various embodiments of the present invention.

Now referring to FIGS. 6-8, the figures illustrate exemplary embodiments of a smart anomaly detection and optimization system for implementing the Artificial Intelligent Client Engine (AICE) on the PLC (Programmable Logic Control) for detecting and predicting anomaly parameter in one or more network terminals and optimizing the behavior of the said one or more network terminal in a distributed network.

Additionally, the smart anomaly detection and optimization system allows an Artificial Intelligent Server Engine (AISE) to provide a graphical user interface which is accessible through the AICEPLC (Artificial Intelligent Client Engine (AICE) running on the PLC). Furthermore, the smart anomaly detection and optimization system allows the PLC and AISE to communicate and exchange commands with each other.

Further, the Artificial Intelligent Server Engine (AISE) is adapted to generate an intelligent agent based on the AICE-PLC hardware and software behavioral profile for detecting and predicting anomaly parameter in one or more network terminal and optimizing the behavior of the said one or more network terminals in the distributed network.

In an embodiment, the anomaly detector system is adapted to compare the current behavior of a network terminal with the behavior profile of the network terminals which is pre-stored in a Distributed Knowledge Database. Further, the Artificial Intelligent Server Engine (AISE) is adapted to update and train the intelligent agent based on the predefined schedule or events which are also stored in the distributed knowledge database.

Furthermore, the Artificial Intelligent Server Engine (AISE) is adapted to transfer the intelligent agent to AICE-PLC (the Artificial Intelligent Client Engine (AICE) running on the PLC). The Artificial Intelligent Server Engine (AISE) includes a rules system to determine the action or events. Further, the anomaly detector is adapted to use data mining and data collection for collecting data from one or more Artificial Intelligent Client Engine (AICE) running on the one or more network terminals and store the data in the data storage. Furthermore, the Artificial Intelligent Server Engine (AISE) is adapted to create a distributed knowledge database which contains action or events for one or more intelligent agent running on the one or more network terminal along with the behavior profile of the one or more network terminals.

In an embodiment, the AICEPLC (the Artificial Intelligent Client Engine (AICE) running on the PLC) is adapted to communicate and share data with mobile devices, web application through web server, other computer, and one or more network terminal via internet.

In another embodiment, the AICEPLC includes anomaly detection capability for providing the anomaly information of one or more network terminals to the Artificial Intelligent Server Engine (AISE) for selecting the best intelligent agent. Further, the anomaly information is a type of error, problem or behavioral change or virus in the one or more network terminals. However, this should not be construed as a limitation to the types of anomalies. The present invention is capable of detecting other different types of anomalies also.

Figure 9:
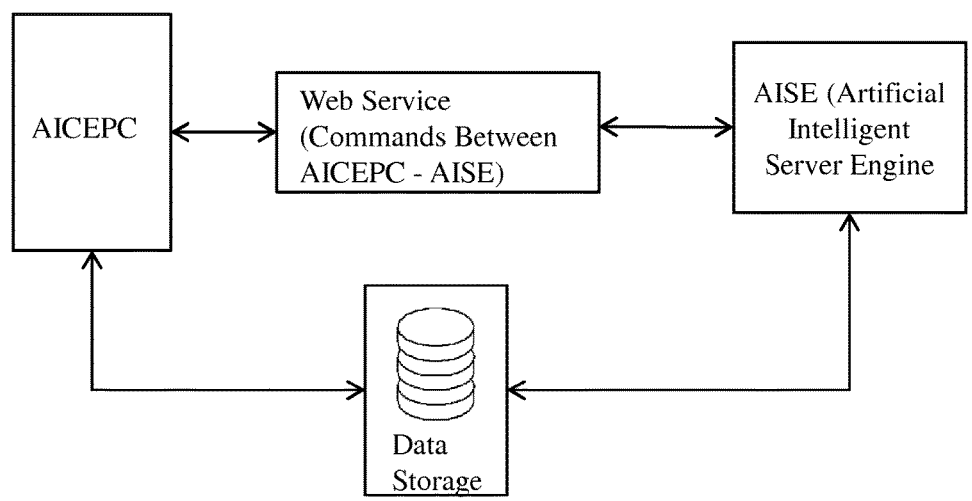
FIG. 9 illustrates a schematic diagram with personal computer (PC) running the Artificial Intelligent Client Engine (AICE), according to various embodiments of the present invention.

Now referring to FIG. 9, which illustrates a smart anomaly detection and optimization system implementing the Artificial Intelligent Client Engine (AICE) running on the personal computer (PC) detecting and predicting anomaly parameter in one or more network terminals and optimizing the behavior of the said one or more network terminal in a distributed network. Further, the system allows an Artificial Intelligent Server Engine (AISE) to provide a graphical user interface which is accessible through the AICEPC running on the personal computer (PC) by using web service.

Figure 10:
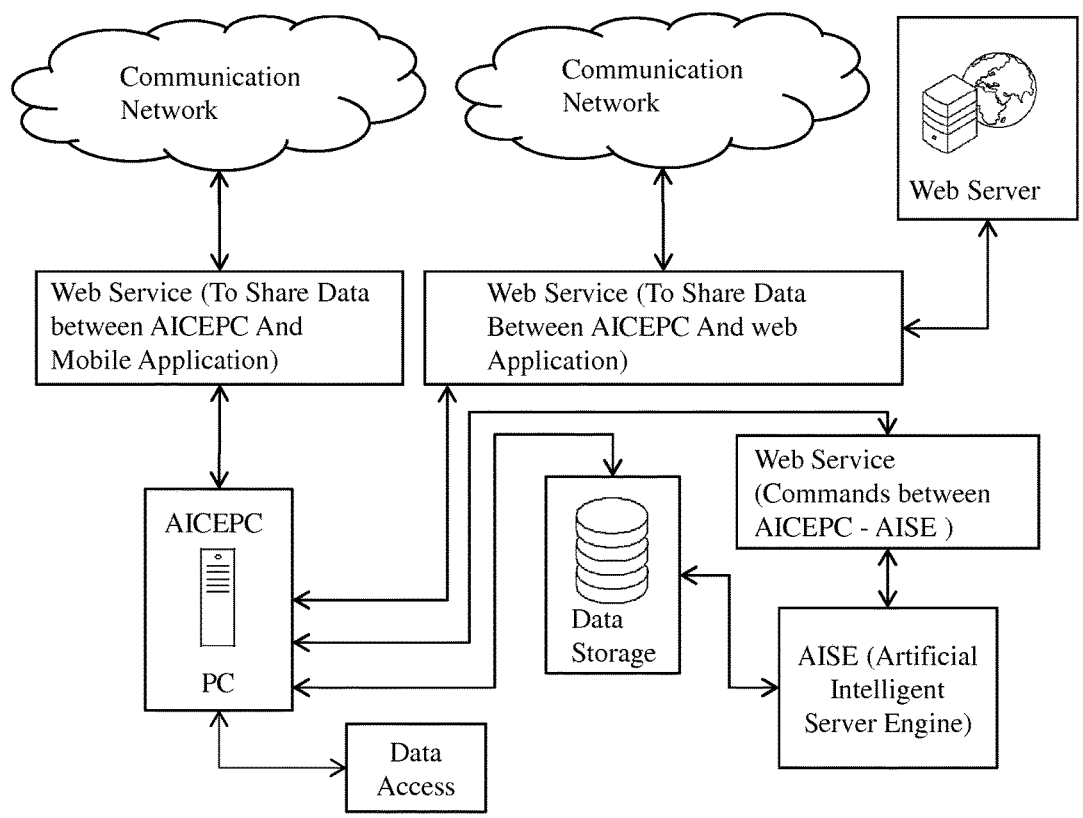
FIG. 10 illustrates a schematic diagram of an example system to provide the Artificial Intelligent Client Engine (AICE) running on computers or embedded systems, according to various embodiments of the present invention.
Figure 11:
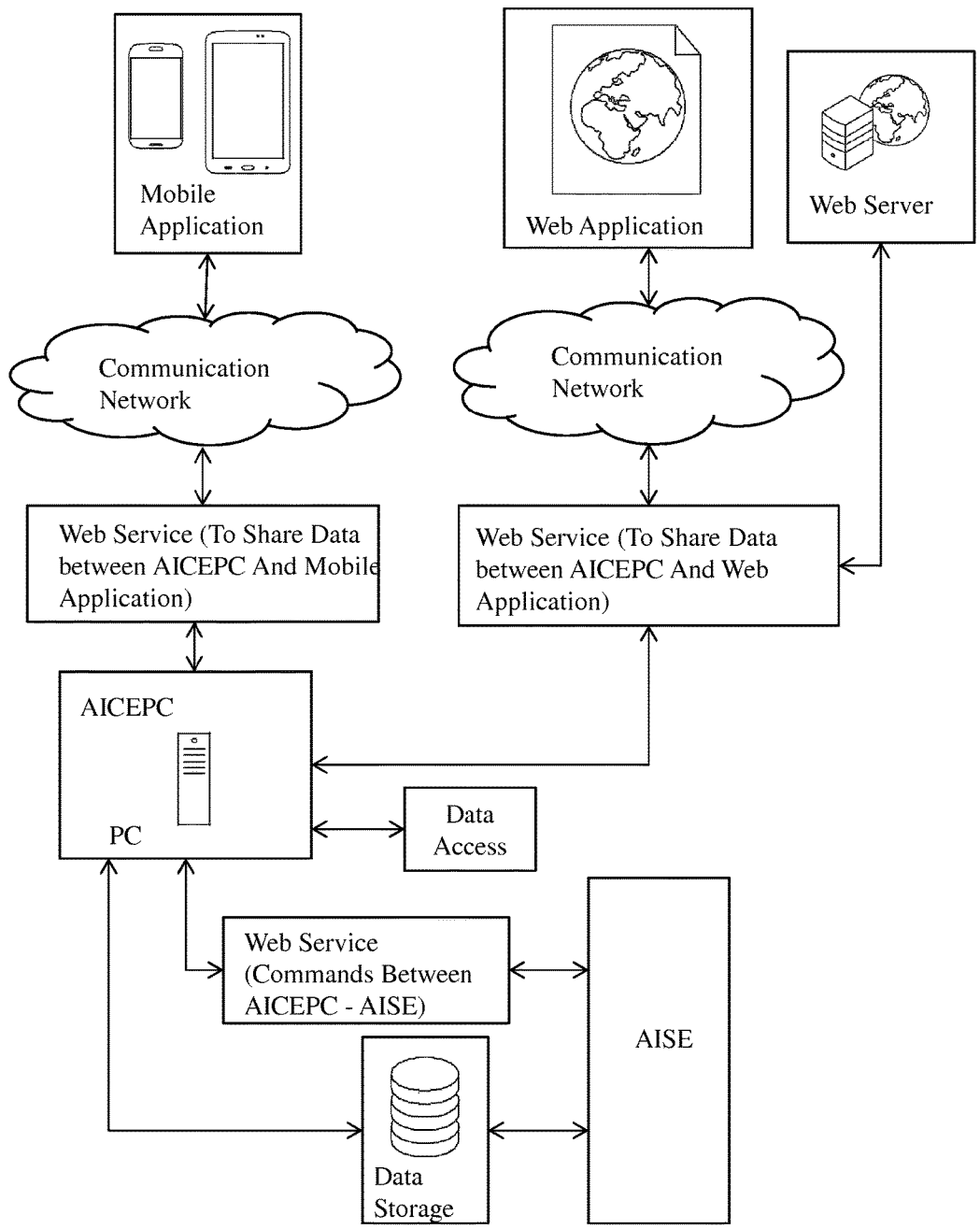
FIG. 11 illustrates a schematic diagram of an example system to provide the Artificial Intelligent Client Engine (AICE) integration on various hardware platform, according to various embodiments of the present invention.

Referring to FIGS. 10-11, there is shown an exemplary smart anomaly detection and optimization system for measuring or determining anomaly parameters based upon collected set of data. In the FIG. 10, there is shown a AICE installed on a PLC and being capable of communicating with various other applications such as mobile application, web application etc. installed on other devices in the communication network. There is shown a web service meant for sharing data among the devices. The AICE installed on the PLC is capable of communicating with the Artificial Intelligent Server Engine AISE for exchanging commands with each other.

Figure 12:
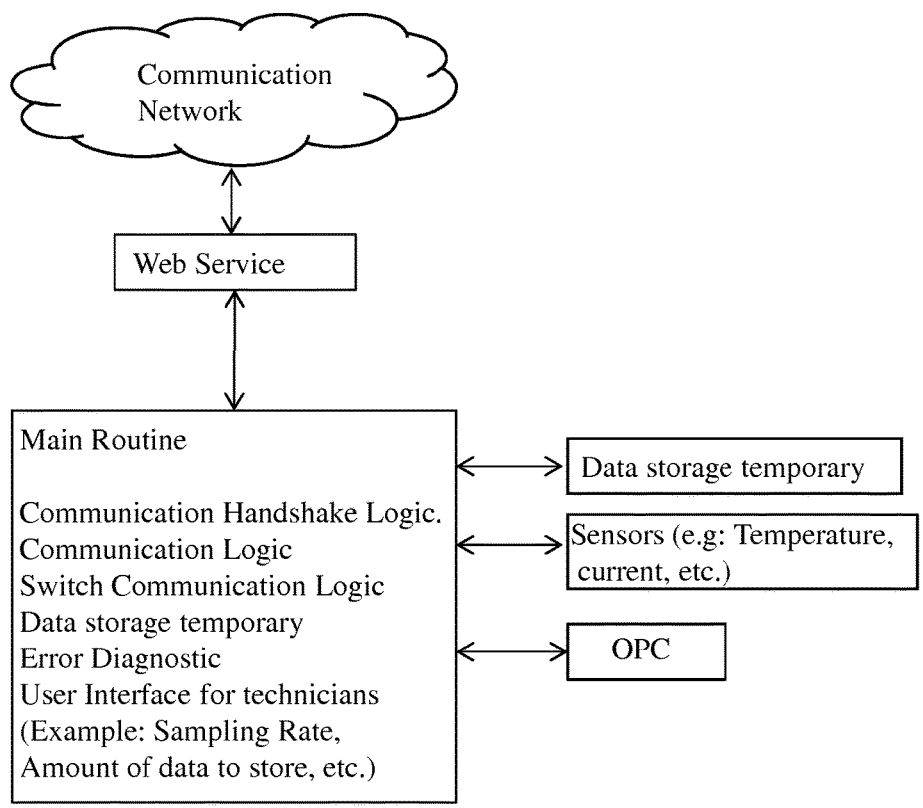
FIG. 12 illustrates a schematic diagram of an open platform communication system, for interaction between hardware and operating system of a computing device, according to various embodiments of the present invention.

Referring to FIG. 12, there is shown an OPC, Open Platform Communications system. It will be apparent to a person skilled in the art that OPC is a software interface standard which allows the operating system programs to communicate with industrial hardware devices. Based upon client server architecture, a handshaking mechanism occurs between the AICE and AISE. The handshaking protocol allows the client and server to acknowledge each other and get ready for data exchange.

Figure 13:
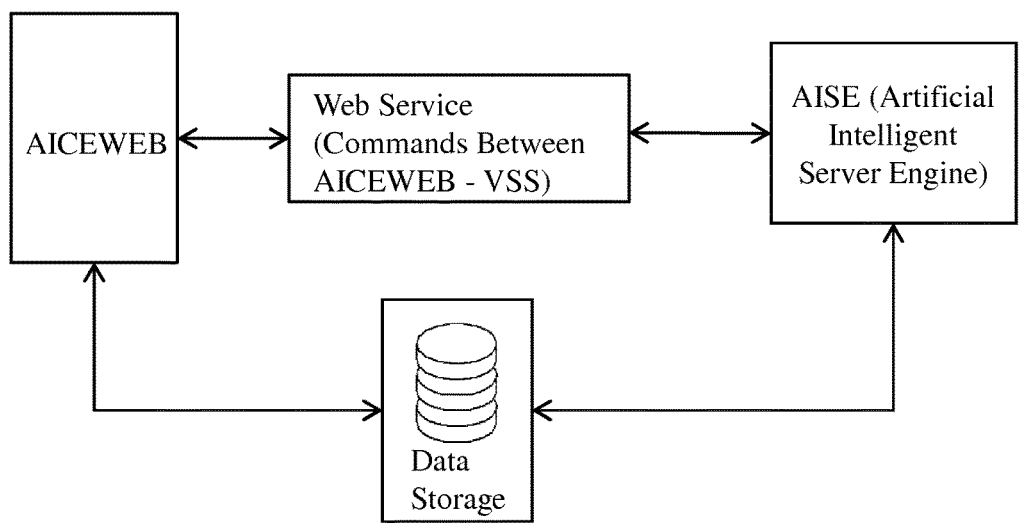
FIG. 13 illustrates a schematic view of Artificial Intelligent Client Engine (AICE) on the web, according to various embodiments of the present invention.
Figure 14:
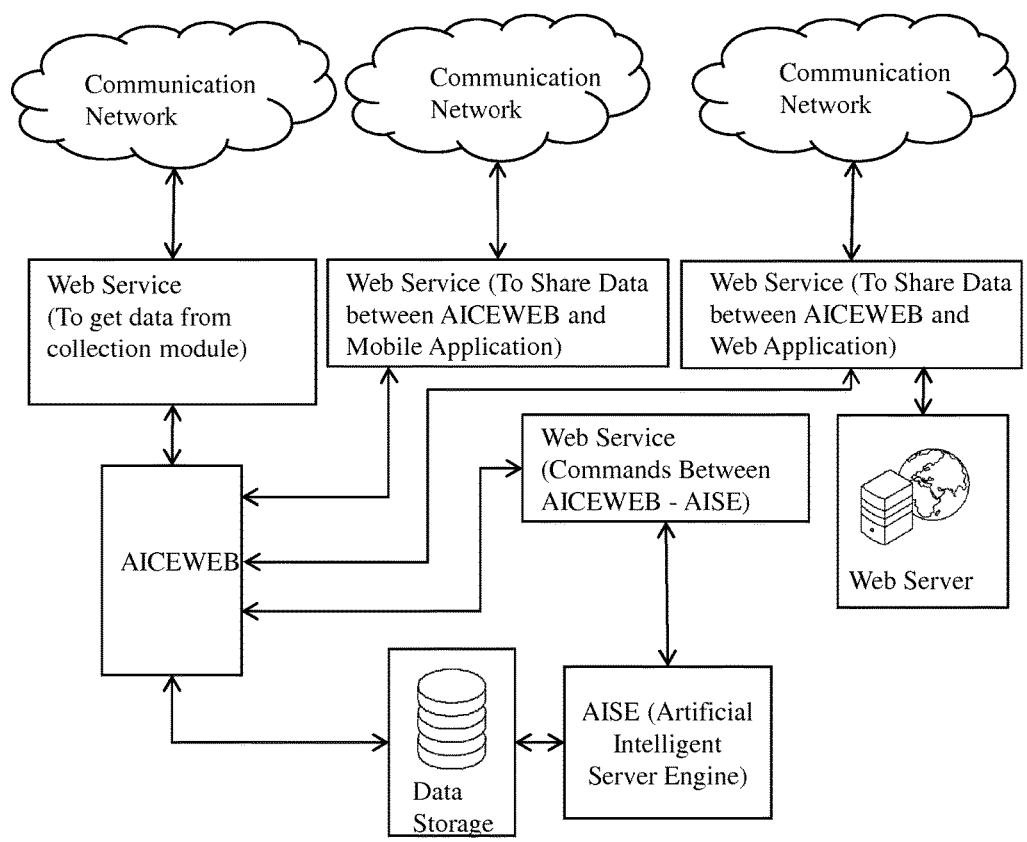
FIG. 14 illustrates a schematic view of Artificial Intelligent Client Engine (AICE) on the web with data collection module, according to various embodiments of the present invention.

Referring to FIG. 13-14, there is shown a smart anomaly detection and optimization system implemented as a web service. The AICE is adapted to be used as a web service. A user (not shown) may access the web service using a web browser such as internet explorer, google chrome, etc. The Artificial Intelligent Client Engine (AICE) named VSCWEB communicates with the Artificial Intelligent Server Engine (AISE) for exchange of commands among each other. The user may access the AICEWEB using any kind of computing device having the capability of accessing the internet. The computing device includes a computer, mobile device, etc. However, this should not be construed as a limitation to the present invention.

In an embodiment, the smart anomaly detection and optimization system includes a data collection module. The said data collection module is meant for collecting data from the one or more network terminals in the communication network. The data collection module is adapted to collect and store data in the distributed knowledge database. The data so collected can be a real time data or offline available data from one or more network terminals.

Figure 15:
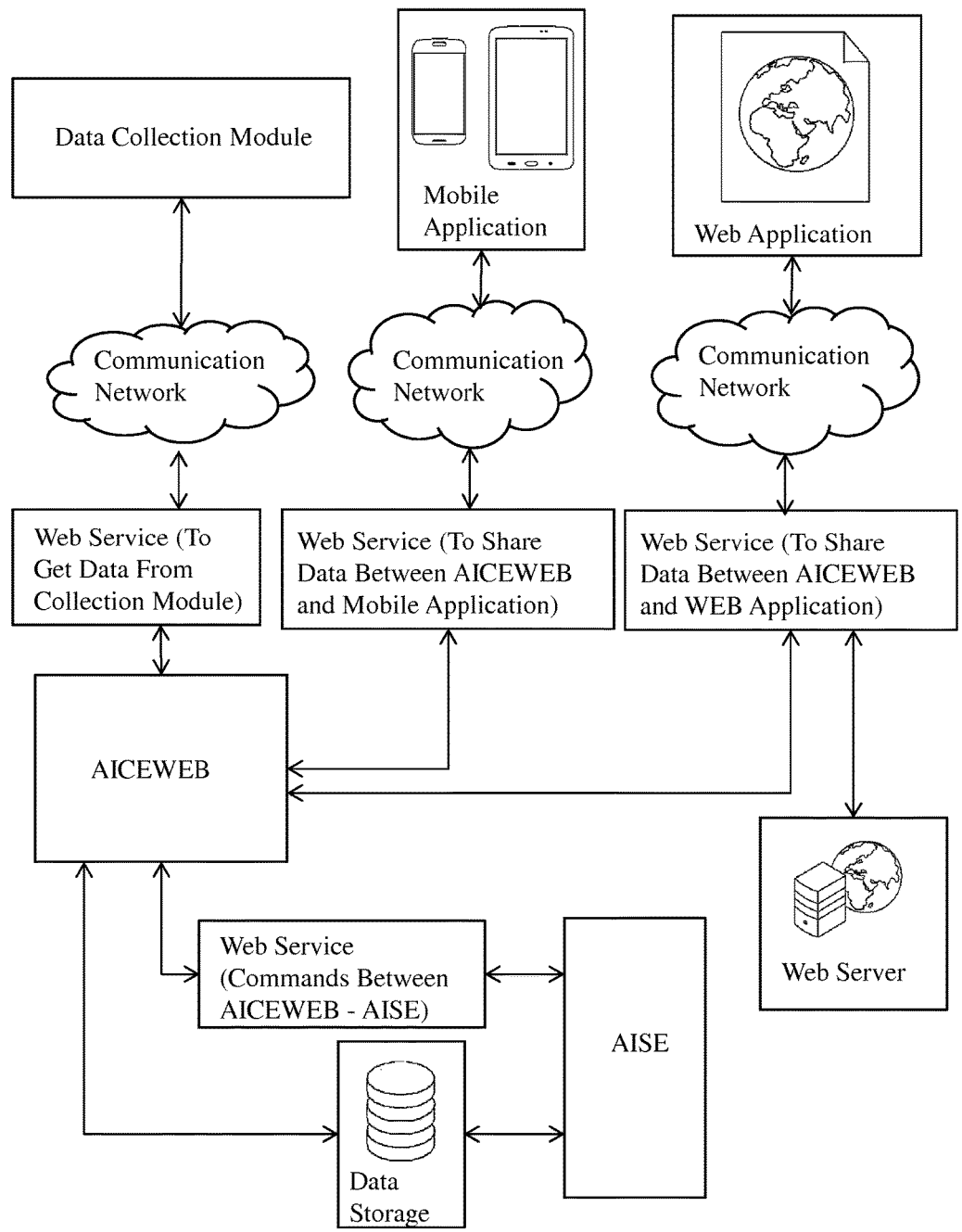
FIG. 15 illustrates a schematic diagram of an example system to provide the Artificial Intelligent Client Engine (AICE) system integration, according to various embodiments of the present invention.

Referring to FIG. 15, there is shown a layout of the distributed architecture where an Artificial Intelligent Client Engine (AICE) is provided on the web. The said Artificial Intelligent Client Engine (AICE) contains a data collection module which is adapted to collect data from various network terminals in the communication network. The Artificial Intelligent Client Engine (AICE) on the web is further adapted to share data with a mobile application. There is shown a (AISE) which stands for Artificial Intelligent Server Engine which exchanges commands with the Artificial Intelligent Client Engine on the web.

The present invention finds wide applicability in areas where control/automation processes are required. Further, the smart and intelligent anomaly detector is capable of detecting and predicting anomaly parameter in one or more network terminals and optimizing the behavior of the said one or more network terminal in a distributed network. Such detection of anomaly proves to be advantageous in various areas such as medical field, health care field, industrial field, commercial field, social field, logistics field, manufacturing field, financial field, and refrigeration field.

The system, as described in the disclosed teachings or any of its components, may be embodied in the form of a computer system. Typical examples of a computer system include a general-purpose computer, a PDA, a cell phone, a programmed microprocessor, a micro-controller, a peripheral integrated circuit element, and other devices or arrangements of devices that are capable of implementing the steps that constitute the method of the disclosed teachings.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer.

In a computer system comprising a general-purpose computer, such may include an input device, and a display unit. Specifically, the computer may comprise a microprocessor, where the microprocessor is connected to a communication bus. The computer may also include a memory. The memory may include Random Access Memory (RAM) and Read Only Memory (ROM). The computer system further comprises a storage device, which can be a hard disk drive or a removable storage drive such as a floppy disk drive, optical disk drive, and the like. The storage device can also comprise other, similar means for loading computer programs or other instructions into the computer system.

The computer system may comprise a communication device to communicate with a remote computer through a network. The communication device can be a wireless communication port, a data cable connecting the computer system with the network, and the like. The network can be a Local Area Network (LAN) or a Wide Area Network (WAN) such as the Internet and the like. The remote computer that is connected to the network can be a general-purpose computer, a server, a PDA, and the like. Further, the computer system can access information from the remote computer through the network.

It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatus configured to implement the method are within the scope of the present invention.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed is:

1. A computer implemented method for developing an anomaly detector for detecting and predicting anomaly parameter in one or more network terminals and optimizing the behavior of the said one or more network terminal in a distributed network, the computer implemented method comprising,
    collecting behavioral data from the one or more network terminals;
    monitoring the behavior of the one or more network terminals on the basis of collected behavioral data;
    detecting anomaly parameter in the one or more network terminals by comparing the collected behavioral data with the behavior profile of the one or more network terminals,
    wherein the behavior profile of the one or more network terminals is pre-stored in a distributed knowledge database;
    optimizing and updating the behavior of the said one or more network terminals,
    wherein the anomaly detector comprises an Artificial Intelligent Client Engine (AICE) which is configured to select an intelligent agent based at least in part on one or more requirements of the one or more network terminals, wherein the intelligent agent comprises an algorithm for optimizing and updating the behavior of the one or more network terminals in the distributed network; and
    updating the anomaly detector with new behavioral data from the one or more network terminals by a retrain module of the anomaly detector,
    wherein the intelligent agent is updated with new conditions based on the new behavioral data, and wherein the updating of the intelligent agent allows for further optimizing and updating of the behavior of the said one or more network terminals.

2. The computer implemented method as claimed in claim 1, wherein the anomaly detector comprises a hardware platform module for determining structure of the one or more network terminals.

3. The computer implemented method as claimed in claim 1, wherein the distributed knowledge database is stored on a server.

4. The computer implemented method as claimed in claim 1, wherein the behavior profile of the one or more network terminals comprises predefined functioning of the one or more network terminals.

5. The computer implemented method as claimed in claim 4, wherein the predefined functioning comprises the normal interaction of various hardware and software components of the one or more network terminals.

6. A system for detecting and predicting anomaly parameter in one or more network terminals and optimizing the behavior of the said one or more network terminals in a distributed network, the system comprising:
    one or more processors; a memory comprising an anomaly detector and executable by the one or more processors to perform the steps of
    collecting behavioral data from the one or more network terminals;
    monitoring the behavior of the one or more network terminals on the basis of collected behavioral data;
    detecting anomaly parameter in the one or more network terminals by comparing the collected behavioral data with the behavior profile of the one or more network terminals,
    wherein the behavior profile of the one or more network terminals is pre-stored in a distributed knowledge database;
    optimizing and updating the behavior of the said one or more network terminals, wherein the anomaly detector comprises an Artificial Intelligent Client Engine (AICE) which is configured to select an intelligent agent based at least in part on one or more requirements of the one or more network terminals, wherein the intelligent agent comprises an algorithm for optimizing and updating the behavior of the one or more network terminals in the distributed network; and
    updating the anomaly detector with new behavioral data from the one or more network terminals by a retrain module of the anomaly detector,
    wherein the intelligent agent is updated with new conditions based on the new behavioral data, and wherein the updating of the intelligent agent allows for further optimizing and updating of the behavior of the said one or more network terminals.

7. The system as claimed in claim 6, wherein the anomaly detector comprises a hardware platform module for determining structure of the one or more network terminals.

8. The system as claimed in claim 6, wherein the distributed knowledge database is stored on a server.

9. The system as claimed in claim 6, wherein the behavior profile of the one or more network terminal comprises predefined functioning of the one or more network terminals.

10. The system as claimed in claim 9, wherein the predefined functioning comprises the normal interaction of various hardware and software components of the one or more network terminals.

* * * * *